Aug. 21, 1928.
C. C. FARMER
1,681,581
ANGLE COCK DEVICE
Filed Oct. 3, 1927
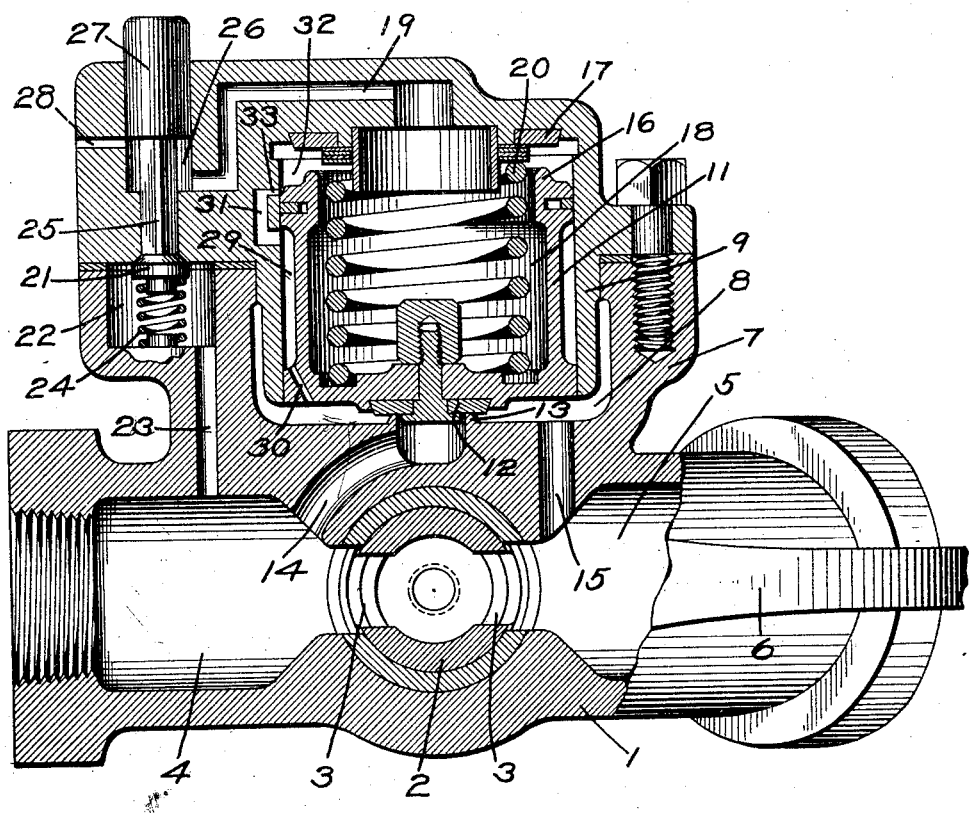
INVENTOR
CLYDE C. FARMER
BY *Wm. M. Cady*
ATTORNEY Patented Aug. 21, 1928.

1,681,581

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ANGLE-COCK DEVICE.

Application filed October 3, 1927. Serial No. 223,531.

This invention relates to angle cocks of the type employed on railway cars for controlling the opening and closing of the train brake pipe at each end of the car.

In order to avoid loss of control of the brakes due to the unintentional or malicious closing of one or more angle cocks in a train, it has been proposed to provide a valve controlled by-pass around the cock key of the angle cock which will provide a free communication from one side of the angle cock key to the other even though the key may be in its closed position.

With the by-pass type of angle cock, when a car having its brake pipe charged with fluid under pressure is coupled to a car in which the brake pipe is not charged, if the angle cock on the charged car be opened, after the brake pipe hose couplings have been coupled together, the pressure in the charged brake pipe may be so reduced by flow to the uncharged brake pipe, that an emergency application of the brakes may be caused.

One object of my invention is to provide an angle cock device with means for preventing a sudden reduction in pressure in the brake pipe when the angle cock is opened.

With an angle cock provided with a by-pass around the key, when cars are uncoupled and the angle cock is turned to closed position, the valve controlling communication through the by-pass may remain open, so that fluid is vented from the brake pipe side of the key to the hose coupling side, which is open to the atmosphere after the hose couplings are separated.

Another object of my invention is to provide means for temporarily closing communication through the by-pass passage, until the cock key has been turned to its closed position In the accompanying drawing, the single figure is a diagrammatic sectional view of an angle cock device embodying my invention.

As shown in the drawing, the angle cock device comprises a body 1 in which is mounted a cock key 2 having the usual openings 3 for connecting the conduit 4 at the brake pipe side of the key with the conduit 5 at the hose side thereof, the key 2 being operable by the usual handle 6.

The body 1 is provided with a flanged extension 7 having a cavity 8, and secured to said extension is a valve body 9 having a piston chamber, in which is mounted a piston 11. The piston cylinder portion of the valve body 9 extends into the cavity 8, and the piston 11 is provided at one end with a seat 12 adapted to engage a seat rib 13 which surrounds an opening leading to a passage 14, which passage opens into the conduit 4. The cavity 8 is connected through passage 15 with conduit 5, so that when the valve seat 12 is lifted away from the seat rib 13, communication is established from conduit 4, around the key 2, to conduit 5.

The opposite end of the piston 11 is provided with an annular seat rib 16, adapted when the piston 11 is moved outwardly to engage a valve seat 17. Opening into the chamber 18 within the seat rib 16 is a passage 19, and contained in said chamber is a coil spring 20 which acts on piston 11 and tends to urge the valve seat 12 into engagement with the seat rib 13.

A valve 21, having a seat in the valve body 9, controls communication from valve chamber 22 to passage 19, and valve chamber 22 is connected to a passage 23 which opens into the conduit 4. A coil spring 24 urges the valve 20 to its seat and said valve is provided with a fluted valve stem 25 which extends into a cylindrical chamber 26, which chamber communicates with passage 19.

Mounted in the chamber 26 is a cylindrical plunger 27 which engages the end of the stem 25 and extends outside of the valve body 9, so that the end of the plunger may be pressed by the hand of the operator. An atmospheric exhaust passage 28 opens into the chamber 26 and is so positioned that normally when the valve stem 25 holds the plunger 27 in its outer position, said passage is open to chamber 26, but when the plunger 27 is depressed, the passage 28 is cut off from chamber 26.

The piston 11 is provided with an extended annular recess 29, and a restricted passage 30 connects said recess with the cavity 8.

When the piston 11 is in its inner position with the valve seat 12 engaging the seat rib 13, a cavity 31 is adapted to connect the recess 29 with chamber 32, the cavity 31 having a restricted portion 33 where the cavity opens to the chamber 32.

With the cock key 2 in its closed position, and the brake pipe charged with fluid under pressure, the valve seat 12 will be held in engagement with the seat rib 13 by the pressure of spring 20, the fluid pressure acting on the small exposed area of the valve seat 12 when the valve seat is in its closed position, not being sufficient to lift the piston 11 against the pressure of the spring 20.

When a car having its brake pipe charged with fluid under pressure is coupled to a car not having a charged brake pipe, before moving the cock key 2 to its open position, the operator first depresses the plunger 27. This operates to cut off the exhaust port 28 and to unseat the valve 21, so that fluid under pressure is supplied from the charged conduit 4 to the uncharged conduit 5 through passage 23, past the open valve 21, through passage 19, and the piston 11 being in its lower position, fluid flows to chamber 32 and thence through cavity 31, recess 29, and port 30 to cavity 8, and thence through passage 15 to conduit 5. When the conduit 5 and the brake pipe connected thereto has become charged to the pressure in conduit 4, the plunger 27 may be released and then the cock key 2 may be turned to its open position, without causing a sudden reduction in pressure in the conduit 4.

When the plunger 27 is released, the spring 24 moves the valve 21 to its seat, and the exhaust port 28 is uncovered. Fluid under pressure is then vented from chamber 32 through the exhaust port 28, and the fluid pressure in cavity 8 acting on the piston 11, together with the fluid pressure acting on the inner seated area of the valve seat 12 operates to move the piston against he pressure of spring 20, so that the valve seat 12 is moved away from the seat rib 13 and communication is now established from conduit 4 around the cock key 2 to conduit 5. If while cars are coupled in a train, an angle cock should be turned to its closed position, either by accident or maliciously, communication will still be maintained through the brake pipe by way of passage 14, cavity 8 and passage 15, so that the brakes may be controlled in the usual manner, even though one or more angle cocks should be in their closed positions.

In uncoupling, the cock key 2 is first turned to its closed position and then the plunger 27 is depressed, so as to cut off the exhaust port 28 and open the valve 21 to admit fluid under pressure from the conduit 4 to the passage 19. The fluid pressure thus supplied to and acting on the area of the piston 11 within the seat rib 16 is sufficient with the pressure of the spring 20 to overcome the pressure of fluid acting on the opposite face of the piston 11, so that the piston is moved downwardly, causing the valve seat 12 to engage the seat rib 13.

This prevents flow of fluid under pressure from conduit 4 to conduit 5 and while holding the plunger 27 depressed, the operator now uncouples the hose couplings. The conduit 5 is thus opened to the atmosphere and consequently the cavity 8 is at atmospheric pressure. The plunger 27 may now be released, so that chamber 32 is connected to the exhaust port 28, without causing the valve seat 12 to unseat, since the pressure of spring 20 is sufficient to hold the piston down and the valve seat 12 seated against the fluid pressure which acts only on the area within the seat rib 13.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An angle cock device having a cock key and provided with a passageway around the key for establishing communication from one side of the key to the other, valve means for controlling communication through said passageway, and manually operated means for controlling the operation of said valve means.

2. An angle cock device having a cock key and provided with a passageway around the key for establishing communication from one side of the key to the other, valve means for controlling communication through said passageway, and manually operated means for effecting the operation of said valve means to close communication through said passageway.

3. An angle cock device having a cock key and provided with a passageway around the key for establishing communication from one side of the key to the other, a valve for controlling said passageway, a piston operated by fluid under pressure for operating said valve to close communication through said passageway, and manually operated means operable to supply fluid under pressure to said piston.

4. An angle cock device having a cock key and provided with a passageway around the key for establishing communication from one side of the key to the other, a valve for controlling said passageway, a piston operated by fluid under pressure for operating said valve to close communication through said passageway, and a manually operable valve for supplying fluid under pressure to said piston.

5. An angle cock device having a cock key and provided with a passageway around the key for establishing communication from one side of the key to the other, valve means for controlling communication through said passageway, and manually operated means for supplying fluid under pressure from one side of the key to the other while the key is in its closed position.

6. An angle cock device having a cock key and provided with a passageway around the key for establishing communication from one side of the key to the other, valve means for controlling communication through said passageway, and manually operated means for supplying fluid under pressure from one side of the key to the other while the key is in its closed position and said valve means is in position cutting off communication through said passageway.

7. An angle cock device having a cock key and provided with a passageway around the key for establishing communication from one side of the key to the other, valve means for controlling communication through said passageway, an additional passageway for establishing communication from one side of the key to the other while said valve means is in its closed position, and a manually operable valve for controlling communication through said additional passageway.

8. An angle cock device having a cock key and provided with a passageway around the key for establishing communication from one side of the key to the other, a valve for controlling communication through said passageway, a piston for operating said valve, and manually operable valve means for controlling the admission and exhaust of fluid under pressure to and from one side of said piston.

In testimony whereof I have hereunto set my hand.

CLYDE C. FARMER.